United States Patent [19]

Felber et al.

[11] 4,074,757
[45] Feb. 21, 1978

[54] METHOD USING LIGNOSULFONATES FOR HIGH-TEMPERATURE PLUGGING

[75] Inventors: Betty J. Felber; Dwight L. Dauben; Richard E. Marrs, all of Tulsa, Okla.

[73] Assignee: Standard Oil Company (Indiana), Chicago, Ill.

[21] Appl. No.: 795,341

[22] Filed: May 9, 1977

Related U.S. Application Data

[63] Continuation of Ser. No..710,963, Aug. 2, 1977, abandoned, which is a continuation-in-part of Ser. No. 592,849, July 3, 1975, abandoned.

[51] Int. Cl.$^2$ .................... E21B 33/138; E21B 43/24
[52] U.S. Cl. .................................. 166/261; 166/272; 166/288; 166/294
[58] Field of Search ............... 166/288, 292, 261, 270, 166/271–273, 259, 263, 294

[56] References Cited

U.S. PATENT DOCUMENTS

| | | | |
|---|---|---|---|
| 3,180,748 | 4/1965 | Holmgren et al. | 166/292 |
| 3,198,249 | 8/1965 | Willman | 166/288 |
| 3,547,195 | 12/1970 | Elkins | 166/288 |
| 3,566,067 | 3/1971 | Shelton et al. | 166/288 |
| 3,638,729 | 2/1972 | Parker | 166/273 |
| 3,669,188 | 6/1972 | Coles et al. | 166/288 |
| 3,897,827 | 8/1975 | Felber et al. | 166/274 |

*Primary Examiner*—Stephen J. Novosad
*Attorney, Agent, or Firm*—Robert B. Stevenson

[57] ABSTRACT

A method of selective plugging of undesirable high permeability streaks and channels in oil-bearing reservoirs during high temperature (250° F or higher) injection recovery processes such as steamflooding, underground combustion, flooding of a naturally occurring high-temperature reservoir or the like. Improved sweep efficiency can be effected by injecting a gel-forming solution consisting essentially of sodium or ammonium lignosulfonate and water or brine in the absence of other gelation promoters and then allowing the high temperatures of the underground formation to promote gelation. Optionally, a precooling water injection step can be used prior to placement of the gel-forming solution. This system has the advantage of gel times which are sufficiently long at temperatures in excess of 250° F to permit placement of large volumes characteristic of commercial use. This method is particularly useful in selectively forming firm, strong gels in thief zones for steamflooding recovery operations.

12 Claims, 5 Drawing Figures

METHOD USING LIGNOSULFONATES FOR HIGH-TEMPERATURE PLUGGING

CROSS-REFERENCE TO RELATED APPLICATION

This is a continuation of application Ser. No. 710,963 filed Aug. 2, 1977, now abandoned, which is a continuation-in-part of application Ser. No. 592,849, filed July 3, 1975, also now abandoned.

BACKGROUND OF THE INVENTION

1. Field of the Invention

The present invention relates to the recovery of oil from underground deposits thereof, in which the permeability is highly nonuniform, resulting in inefficient sweep when such deposit is subjected to steamflooding or other high temperature operation. More particularly, it is concerned with improving the sweep efficiency in a steamflooding operation by selectively plugging the loose or highly permeable streaks in the matrix with long set-time lignosulfonate gels.

2. Description of the Prior Art

Methods for plugging or reducing the rate of fluid movement in porous media make up a substantial amount of technology, including the in-place formation of gels. One current technique involves selective plugging using time-set alkaline gels of sodium silicate. However, the applicable time-set range of these gels limits the treatment volumes. This limitation of silica solutions is particularly severe at temperatures above 170° F because of the pronounced shortening of the gel times. Also, the presence of formation brines or contacts with an acid medium, such as $CO_2$, causes the silicate solution to set prematurely. Moreover, the cost of silicate solutions is such that their use in volumes that would really be effective, e.g., at least 5,000 barrels, is limited.

In a commonly assigned U.S. Pat. No. 3,897,827 by Felber et al., a method for selective plugging in porous media utilizing lignosulfonate gels activated by a mixture of dichromate and salt is disclosed. The mixed accelerator lignosulfonate gel system possesses the specific advantage, in addition to being economically feasible, of having sufficiently long set-times prior to gelation to allow use at temperatures characteristic of waterflooding and the like. However, these same compositions of U.S. Pat. No. 3,897,827 have a pragmatic upper limit of about 250° F above which the gel time decreases sufficiently to prohibit large volume oil field treatments. Because of this limitation the mixed accelerator method cannot be used in ultra-hot reservoirs, steamflooding operations or underground combustion techniques.

SUMMARY OF THE INVENTION

In view of the above problem, we have discovered in a method for the recovery of oil from an underground deposit thereof, the deposit being penetrated by an injection well and by a producing well, in which method a steamflooding medium, underground combustion medium, or other high-temperature flooding medium is injected into the deposit through the injection well to displace oil toward the producing well, and wherein said steamflooding, combustion medium, or other high-temperature flooding medium tends to channel through relatively high permeability strata in the deposit, resulting in a nonuniform steamflood, combustion front, or high-temperature flooding front, the improvement which comprises introducing into the deposit an aqueous gel-forming solution of a water soluble lignosulfonate containing from 2 to about 20 weight percent reducing sugar wherein the solution is capable of gelation at temperatures in excess of 250° F, with a characteristic gel time from about 1 to about 2,000 hours, and the solution being in an amount sufficient to flow into the high permeability strata, allowing the solution to set in the high permeability strata to form a gel therein, thereafter introducing the steamflooding or combustion medium into said deposit through said injection well, and recovering oil from said producing well.

DESCRIPTION OF THE PREFERRED EMBODIMENT

Figure 1:
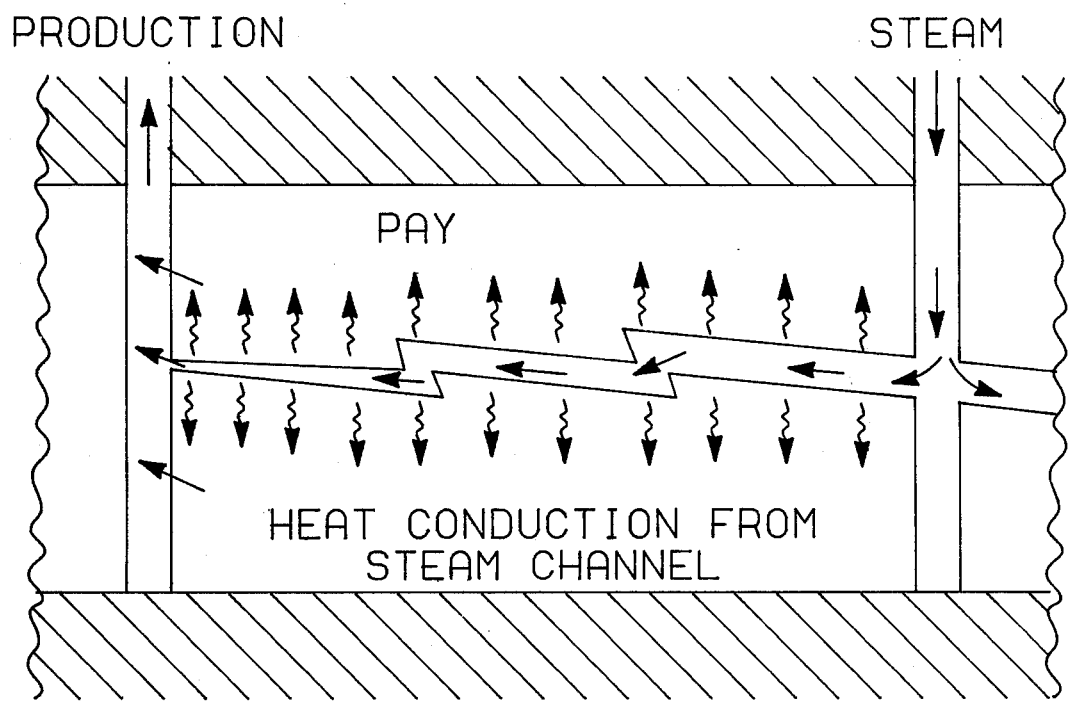
FIG. 1 depicts channeling of steam through the reservoir. This channeling is initially beneficial because it allows heat to be transferred to the reservoir throughout the interwell area. With continued injection of steam, steam channeling becomes a problem and oil production can drop to levels that are not economic. The placement of a gel in the steam channel can allow subsequent injected steam to invade a greater portion of the reservoir.

In carrying out our invention, we are able to reduce the permeability of an ultra-high temperature, >250° F, oil-bearing formation by injecting into the formation, either through a suitable injection well or producing well, a dilute solution of an alkali metal, alkaline earth metal or ammonium lignosulfonate in the absence of a gel activating substance such as dichromate and salt. This dilute solution, which may contain the lignosulfonate in concentrations of from about 3 to about 20 weight percent, preferably 4 to 10 weight percent, based on the weight of the final solution, is displaced from the wellbore and into the ultra-high temperature problem zone, after which it is allowed to set until the latent heat of the reservoir promotes gelation. The gel time of the injected solution depends almost exclusively upon the actual temperature experienced during set. If the problem zone is at or near the wellbore face, a short-set time, e.g., 10 hours, solution may be used and a temperature range of about 250° F to about 450° F or slightly greater is operative. On the other hand, if it is intended to treat a relatively large interwell area, the solution should have a gel time of at least about 100 hours, and possibly as much as 1,200 to 2,000 hours or more. For set times of this magnitude a reservoir temperature of about 275° F to about 350° F is preferred. Knowing the formation temperature and volume of gel-forming solution to be injected, the feasibility of using the unactivated ammonium lignosulfonate gel-forming solutions can be determined. Owing to the fact that relatively long gel set times, especially those characteristic of such high temperature processes as steamflooding and underground combustion, can be obtained by the use of our invention, it is possible to displace large volumes of gel-forming solutions for much greater distances into the more permeable sections of the formation, resulting in creating a pronounced permeability contrast, which, in turn, favors greater sweep efficiency by forcing the flood medium into what were formerly the tighter oil-bearing zones. In this way, oil displacement efficiency is enhanced by the creation of a more uniform steamflood or combustion front advance. The lignosulfonate solution enters the various strata of the formation open to the injection well in proportion to the water permeability of the strata, since the initial flow rate of said solution into the various zones per vertical foot thereof open to the well is highest in the most permeable zones and lowest in the least permeable strata.

Where possible, it is desirable to isolate the offending, high permeability zone by one or more packers or plug-back procedures. The gel-forming solution is then injected into the offending interval while water (or oil if a producing well) is injected into the remaining portion of the formation. This injection procedure insures that the injected gel-forming solution is confined largely to the high permeability zone. Ideally, the relative flow should be balanced so that there is no tendency of the gel-forming solution to flow into the tighter sections. Regulation of flow rates can be achieved by adding a radioactive substance to the gel-forming solution or to the water and locating a gamma ray detecting instrument in the tubing during injection. Balancing flows by this method is known to those skilled in well completion and treatment techniques.

In situations in which the required placement time exceeds the gel time associated with the particular reservoir temperature, a precooling injection step can be used advantageously. Such a step is particularly useful for large volume plugging operations at temperatures in excess of about 325° F. In this precooling step a predetermined amount of water, brine, or the like is injected into the offending interval with the intent of cooling the substrata to a temperature which would be compatible with the desired gel time. The gel-forming solution is then immediately injected. As in the actual placement of the lignosulfonate solution, the precooling injection preferably takes advantage of the known flow balancing methods in conjunction with a heat balance calculation.

As previously mentioned, dichromate alone has been used in the past in combination with lignosulfonates to produce gels. The use of such compositions for our purposes, however, is objectionable for at least two reasons. First, because of the relatively high dichromate concentration, i.e., 4.5 weight percent and above, they are too costly to be employed in the volumes contemplated herein, and, secondly, they gel too fast to be of any practical value. Also, as previously acknowledged, a U.S. patent exists which teaches the use of a dichromate salt mixed with alkali metal or alkaline earth metal salts as promoters for lignosulfonate gels. Such a system is economically feasible and commercially practical for long gel times and temperatures under about 250° F. Above this temperature, the mixed salt promoted system similar to the dichromate system will gel far too rapidly to be of practical use. In cases where it is desired to plug portions of the formation in the vicinity of the wellbore, gel times of from 1 to 30 hours are useful with 10 to 20 hours preferred. Generally, the lignosulfonate systems of our invention will possess such gel times when used at temperatures in excess of about 400° F. Thus, they are particularly useful for plugging in the vicinity of the wellbore at temperatures in excess of 400° F. Furthermore, injection times of 1 to 5 weeks, or more, are necessary in order to introduce the required volume of gel-forming solution for extensive plugging of the more permeable zones in the interwell area. This, in turn, means that the gel time of such solutions should be at least as long as the injection period. If, in addition, the reservoir of interest is an ultra-high temperature formation or is one undergoing a high temperature injection process such as steamflooding or the like, the dichromate as well as the dichromate/mixed salt systems are inherently ruled out.

In contrast to this, we have found that the gel formation time associated with the systems of our present invention are economically feasible and commercially operative even at ultra-high temperatures. Accordingly, it has been found that set times of the systems contemplated herein are dependent upon the temperature to which the solutions are subjected and on the nature or source of the lignosulfonate.

The lignosulfonates used in preparing the gel-forming solutions of our invention are a byproduct of the wood pulp industry and are generally supplied in the form of a concentrated (50 to 60% solids) aqueous solution of the sodium or ammonium salt, or as a powdered ammonium, alkali metal, or alkaline earth metal salt. The latter, however, shows considerable filterable solids after it is put in the solution, and therefore should be filtered before use to avoid face plugging of the injection well. The sodium and ammonium lignosulfonates supplied in liquid form generally are found to be free of objectionable amounts of filterable solids. Ammonium lignosulfonate is also considered to be desirable as a gelling agent because of the low cost and relatively uniform properties including a tendency to resist biological degradation after placement. Sodium lignosulfonate has the additional advantage of longer gel times at a given temperature; therefore, it is considered the more desirable form for very large plugging operations. However, the sodium form is somewhat more susceptible to biological degradation, therefore requiring the use of a preservative such as sodium benzoate, sodium pentachlorophenate or the like. Examples of preferred products are TREX ® LTA, an ammonium lignosulfonate sold by Scott Paper Company and Raylig ®-261L, a sodium lignosulfonate sold by ITT Rayonier. Ammonium lignosulfonates are formed by cooking wood pulp in a digester under controlled conditions of temperature (140°-150° F) and pressure with ammonium bisulfite and sulfur dioxide. The ammonium bisulfite and sulfur dioxide react with the lignin contained in wood to form water-soluble lignosulfonates. The resulting product is a complex mixture of ammonium lignin sulfonates, wood sugars, and other carbohydrates. Simple filtration removes the lignosulfonate (10% solids) from the wood pulp. Sodium lignosulfonate is produced in an analogous manner with sodium bisulfite being used rather than ammonium bisulfite.

In preparing these gel-forming solutions in the field for use, measured amounts of lignosulfonates are thoroughly dissolved in water or brine in a suitable circulating or mixing tank to give a gel-forming solution of the desired lignosulfonate content. The amount of lignosulfonate present may vary, but generally should not exceed about 10 weight percent.

The quantity of lignosulfonate solution employed may vary widely from well to well, depending on the distance out into the formation it is desired to form the gel. In some cases, it may be necessary to extend the gel-forming solution as much as several hundred feet out from the well, in which case volumes of the order of tens of thousands of barrels may be required. Thief zones or heterogeneities at or near the wellbore generally may need not more than about 5 to about 25 barrels of gel-forming solution per vertical foot of formation. In these volumes the gel-forming solution can be displaced out into high permeability streaks from 15 to 75 feet. Generally speaking, however, the volume of solution used depends upon the gel time of the solution, the nature of the problem and the characteristics of the formation. For a given situation, the volume of solution required to penetrate a given distance from the wellbore may be computed by knowledge of the thickness and porosity of the problem zone.

Figure 2:
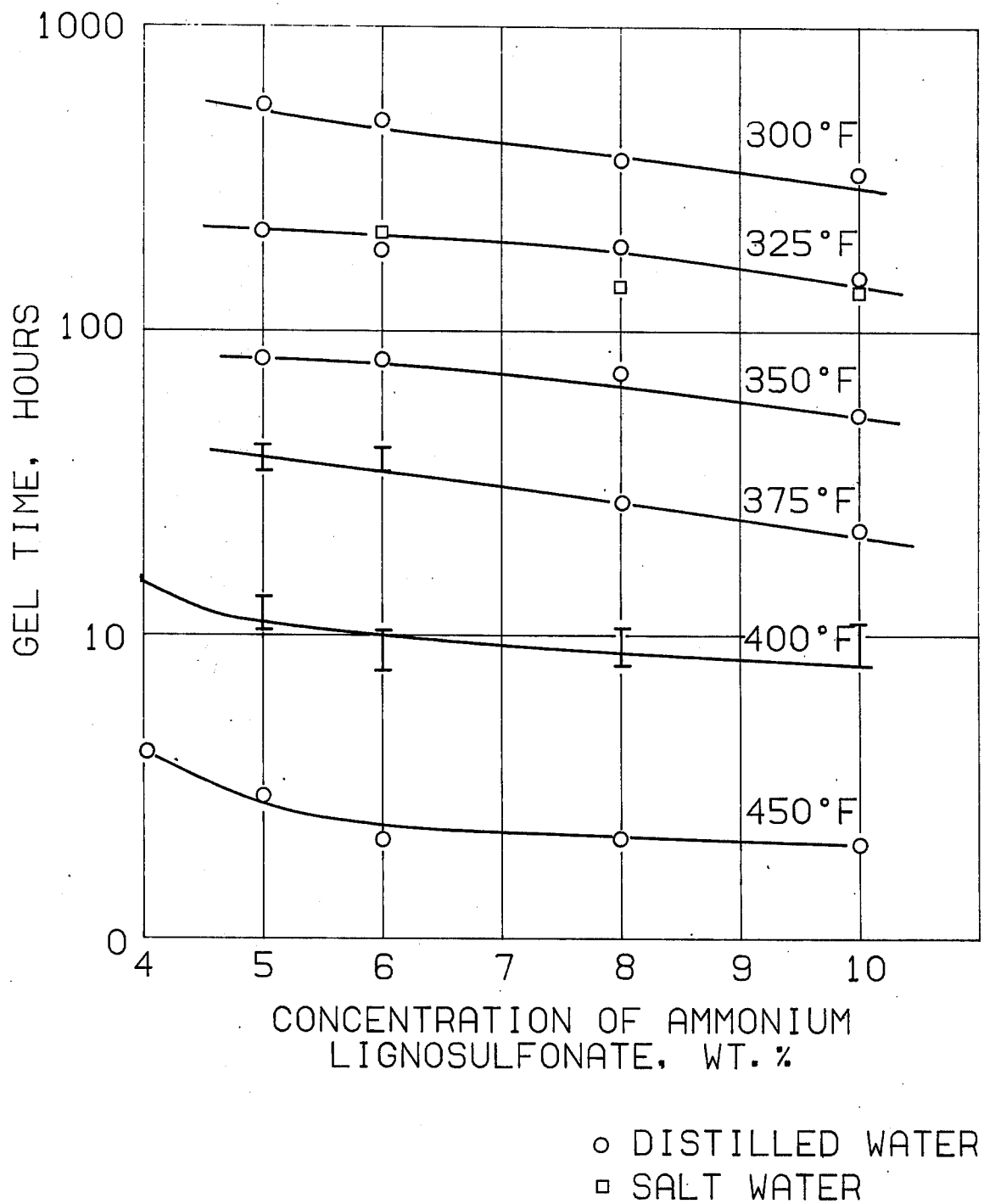
FIG. 2 illustrates the relationship between gel time expressed in hours and the concentration of ammonium lignosulfonate expresed as weight percent present in the gel-forming solution at various temperatures. The particular ammonium lignosulfonate solutions of FIG. 2 were made from a liquid ammonium lignosulfonate concentrated crude material, 50 to 60 percent solids, derived from a 66 percent softwood and 34 percent hardwood mixture. This gel-forming solution was then made by either diluting the crude concentrate with distilled water (circles) or a salt solution (squares) characteristic of a known oilfield brine. As indicated, long set times can be attained at temperatures below 350° F. At temperatures greater than 350° F moderate to short gel times are observed. The relatively flat curves indicate that gel times are somewhat insensitive to variations in concentration of the ammonium lignosulfonates over the operative range of interest. This leads to the advantage in oilfield applications of maintaining a predictable gel time even if adsorption occurs in the reservoir. Generally, gels do not form at concentrations less than 4 weight percent.
Figure 3:
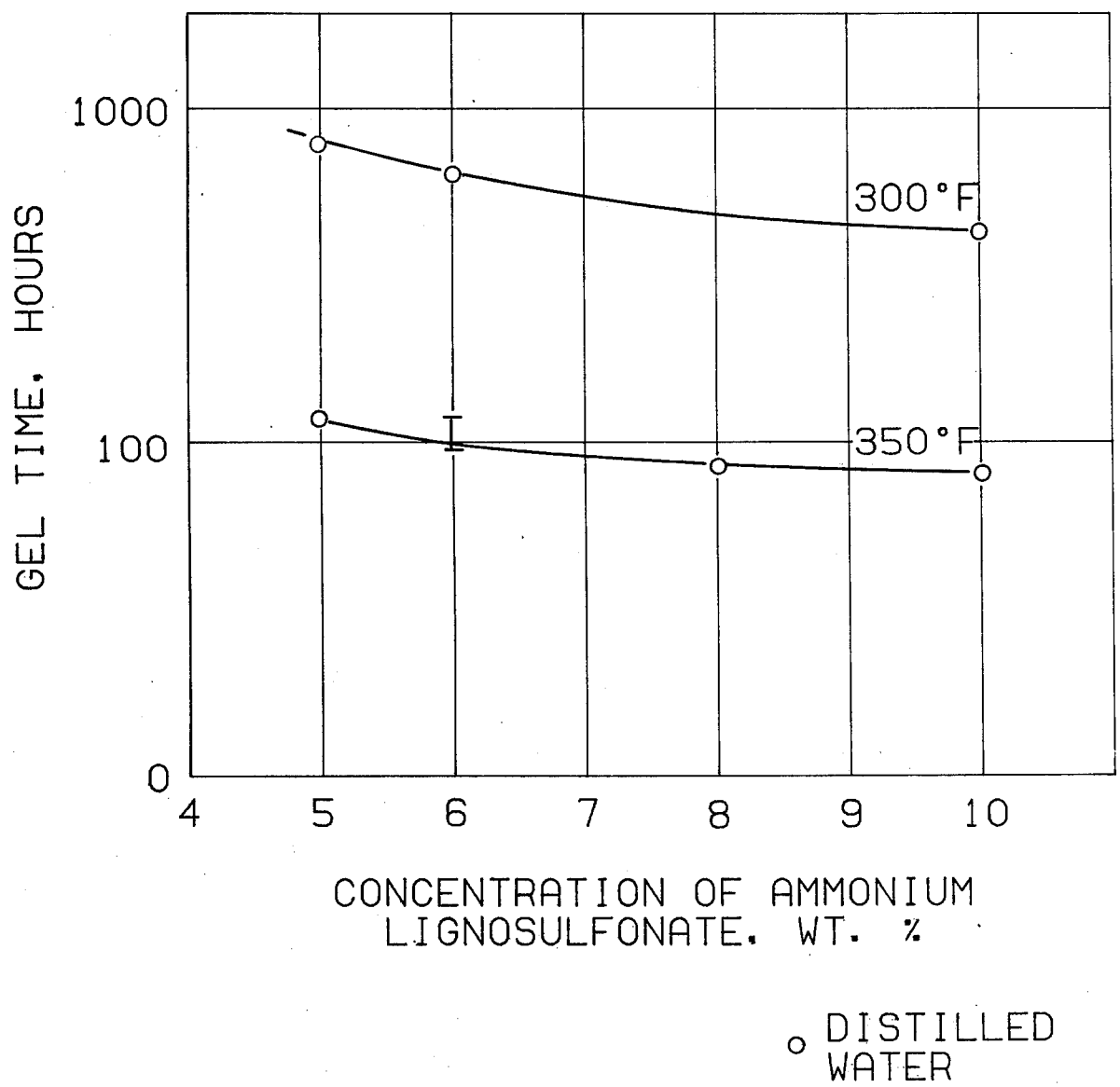
FIG. 3 illustrates data similar to FIG. 2 except the ammonium lignosulfonate was derived from pulping of 100 percent softwood. Again, the relatively constant gel times within lignosulfonate concentration are advantageous for field application of these gels. Somewhat longer set times can be attained by using ammonium lignosulfonates produced from softwoods.
Figure 4:
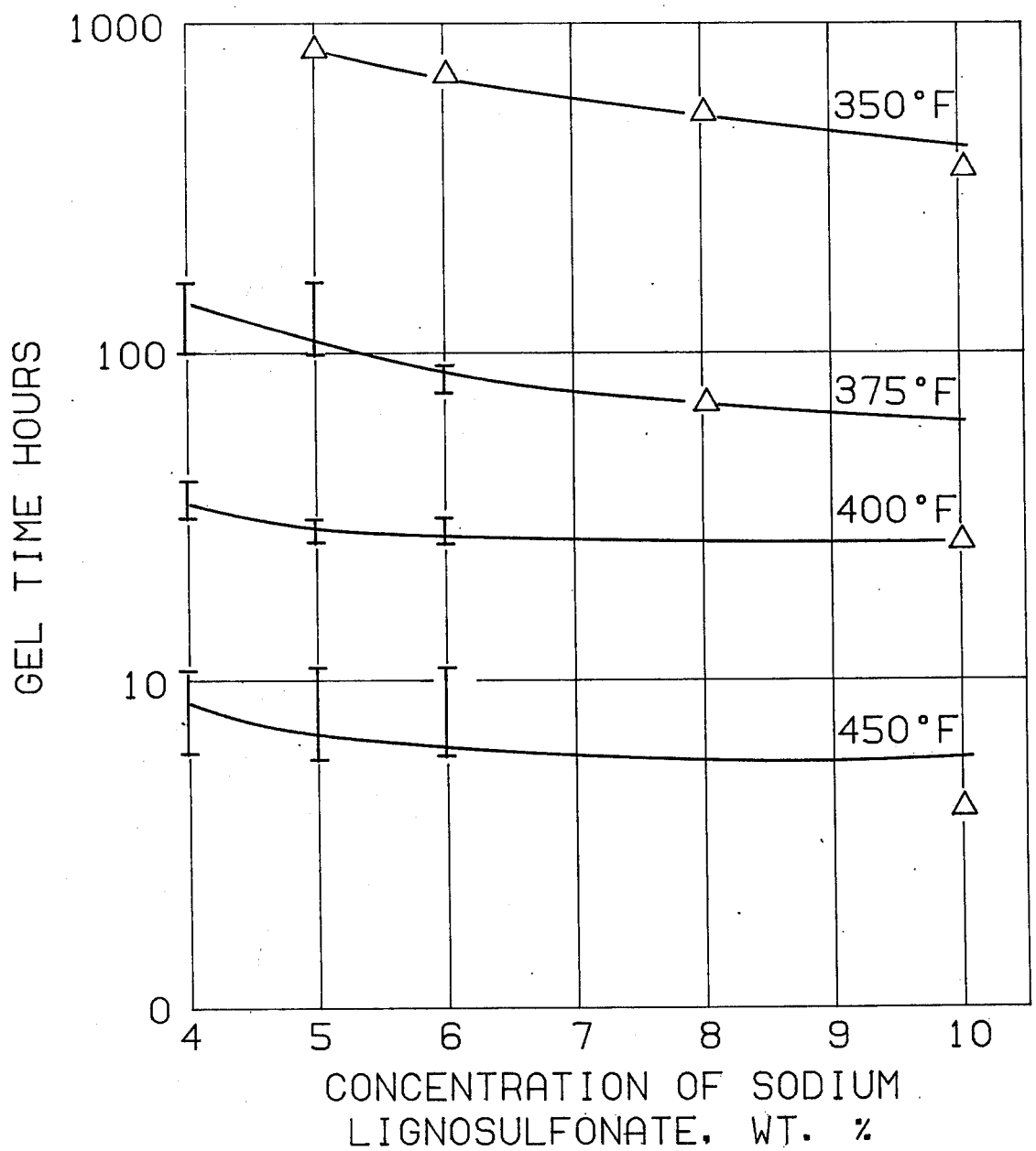
FIG. 4 illustrates data for sodium lignosulfonate similar to that of FIGS. 2 and 3 for ammonium lignosulfonate. The particular sodium lignosulfonate solutions of FIG. 4 were made by diluting a crude concentrate liquid having a solids content of 50 percent derived from 97 percent softwood and 3 percent hardwood. In addition to the relatively constant gel times, the sodium lignosulfonate exhibits much longer gel times at a given temperature relative to the gel times of the ammonium lignosulfonates.

The preferred embodiments of our invention are further illustrated by reference to the accompanying drawings wherein FIG. 2 and FIG. 3 show gel time curves of ammonium lignosulfonate and FIG. 4 shows gel time curves of sodium lignosulfonate derived from a mixture of 66% softwood and 34% hardwood, from a 100% softwood and from 97% softwood and 3% hardwood respectively. The points within either a circle, a square or a triangle represent the results of individual experimental runs while the vertical bars represent the range of results from experimental measurements. Each experimental measurement or run was performed essentially in the following manner.

First, the gel-forming solution of desired concentration was prepared at room temperature using commercially available sodium or ammonium lignosulfonate and either distilled water or brine. Approximately a 10 ml sample of the gel-forming solution was placed in a high pressure cylinder made out of seamless ½ inch O.D., 0.049 inch wall thickness, type 316 stainless steel tubing (ASTM SPEC-A-269 and A-249). The cylinder was approximately 9½ inches high and ½ inch in diameter and had sufficient volume to allow for expansion of the solution when heated. The bottom end of the cylinder was sealed with a stainless steel Swagelok ® fitting and plug and a ferrous steel ball, free to rise and fall within the cylinder, was inserted after a 1½ inch piece of ¼ inch stainless steel tubing was placed in the bottom of the cylinder as a seat for the ball. Under a $N_2$ purge, a second stainless steel fitting containing an ⅛ inch steel pressure line was then used to seal the upper end of the cylinder. The cylinder was then charged with $N_2$ to a pressure of about 700 to 1000 psi depending on the temperature such that water would not evaporate during testing. (Two hundred psi above vapor pressure of water is sufficient.) The cylinder was then held in a vertical position in an oven and heated to the desired temperature. Periodically, a magnet was used to lift the steel ball off the bottom of the cylinder and the ball was then allowed to drop back to the bottom. A mechanics stethoscope was used to detect the ball reseating at the bottom. Failure to hear the impact corresponds to the solution having gelled. At such time the cylinder was cooled, removed, depressurized and opened to confirm the presence of a firm gel. The time to gel was recorded and is plotted in FIG. 2, FIG. 3, and FIG. 4.

From the data presented in FIGS. 2, 3, and 4 it can be seen that the ammonium and sodium lignosulfonate gel systems in the absence of dichromate salt promoters are operative at temperatures characteristic of steamflooding, underground combustion, naturally occurring high-temperature reservoirs and the like. These systems exhibit ideally flat gel-time curves across a sufficiently broad concentration range to be able to account for adsorption losses and the like during placement of the gel-forming solution. Consequently, the time required to form a gel will be essentially constant and predictable. It will be independent of minor concentration variations and determined primarily by the actual temperature of the substrata formation. As indicated, commercially practical gel times in excess of 100 hours can be achieved at temperatures as high as 325° F for ammonium lignosulfonate and 350° F for sodium lignosulfonate while gel times of the order of 1,000 hours or even greater are observed at slightly lower temperatures for both. More specifically, the ammonium lignosulfonate will have a gel time of the order of 840 hours at 300° F with gel time approaching values of 1200 hours or greater as the temperature approaches 250° F. For the sodium lignosulfonate a characteristic gel time of 1,200 hours is achieved at about 300° F with the gel time approaching values as high as 2,000 hours as the temperature approaches 250° F. Further, FIG. 3 when compared to FIG. 2 shows that an ammonium lignosulfonate derived from a softwood pulping process will exhibit a somewhat longer gel time at a given temperature than that observed for a mixture of hard and soft woods derived ammonium lignosulfonates. All gels of FIGS. 2, 3, and 4 were categorically firm, strong gels. The use of a salt solution prepared to simulate the composition of a known brine showed virtually no difference from the distilled water samples. This indicates that the lignosulfonate system is compatible with naturally occurring brines found in wells.

Figure 5:
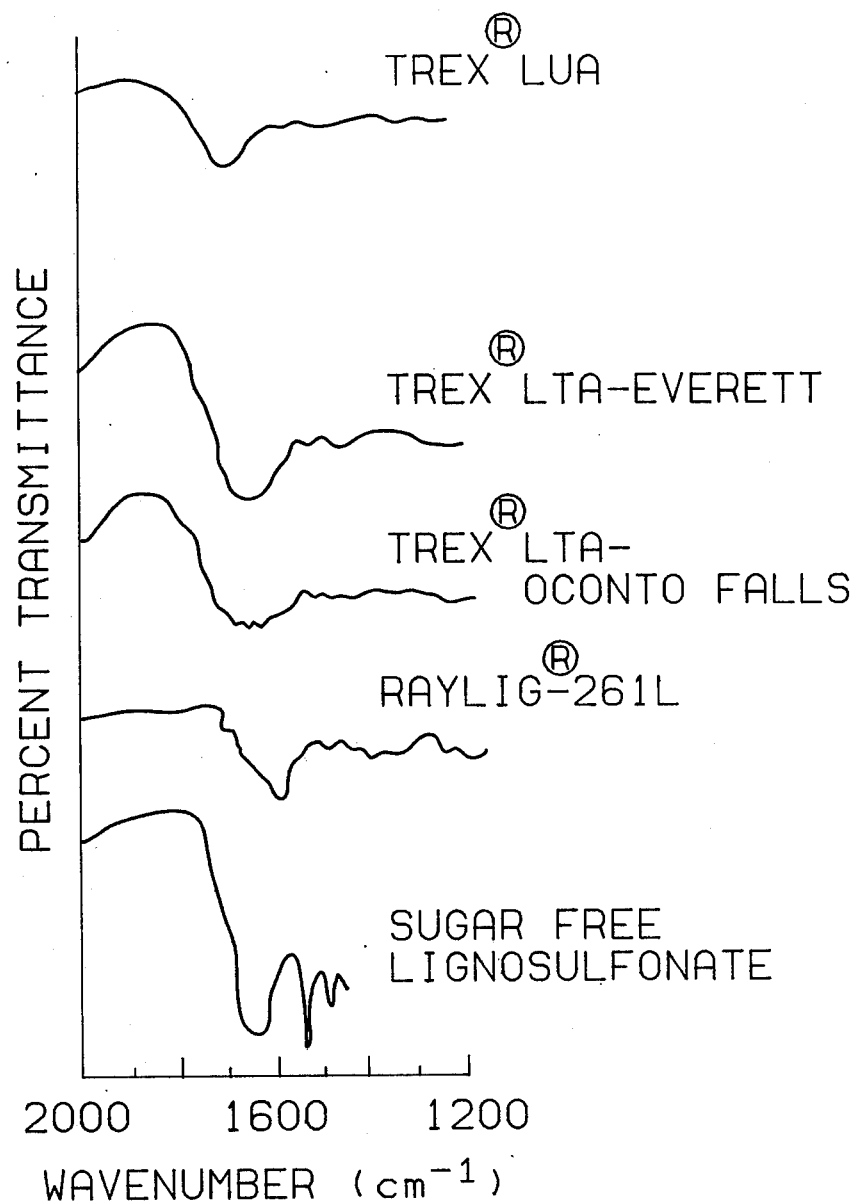
FIG. 5 illustrates a portion of the infrared spectra of three typical ammonium and one typical sodium lignosulfonates suitable for use in our invention. A fifth inoperative sugar-free sodium lignosulfonate infrared spectrum is included for comparison.

FIG. 5 shows a series of infrared spectra obtained with ammonium and sodium lignosulfonate solutions of different compositions. With the exception of the bottom curve, such solutions are within the scope of our invention. The three solutions contained reducing sugars in amounts ranging from 7.1 to 21.2%, while the bottom curve was essentially pure lignosulfonate and was free of reducing sugars. This composition exhibited strong peaks between 1,600 cm$^{-1}$ and 1,430 cm$^{-1}$, indicating the presence of aromatic components and that it is pure. In contrast, the other compositions do not display strong bands in this region, even though they are all aromatic, because of overlapping of the stretching and bending modes of each of the compounds, e.g., reducing sugars, lignosulfonates of varying molecular weights and other carbohydrates present.

The TREX ® LUA sample is a liquid ammonium lignosulfonate fractionated from crude ammonium salt derived from 100% softwood. It contains about 35% solids of which approximately 80% is lignosulfonate as supplied by Scott Paper Company plant at Everett, Wash. The TREX ® LTA-EVERETT sample is a similar liquid ammonium lignosulfonate concentrated from crude material of 50 to 60% solids again from 100% softwood and supplied from the same source. The sample identified as TREX ® LTA-OCONTO FALLS is a liquid ammonium lignosulfonate concentrated crude material of 50 to 60% solids. It is produced by Scott Paper Company at their Oconto Falls, Wis. plant, from a 66% softwood and 34% hardwood pulp mixture. The sample identified as Raylig ®-261L is a liquid sodium lignosulfonate concentrated crude material of about 50% solids content. It is produced by ITT Rayonier, Inc. from pulped 97% softwood and 3% hardwood.

In our investigation, we have discovered that the lignosulfonates containing little, i.e., less than 2 weight percent, or no sugars are unsatisfactory for preparing gel-forming solutions having gel set times that approach practical limits. Generally speaking, the commercially available compositions contain from about 50 to 60% solids with a maximum of about 80% of these solids being lignosulfonates with the balance consisting of sulfur, reducing sugars, ash and nitrogen. The reducing sugar content of these compositions generally ranges from about 2 to about 20%.

While the foregoing description is illustrative of various embodiments of our invention, it is not to be construed as limiting the scope thereof. For example, other volumes of gel-forming solutions outside the ranges mentioned may be used to advantage. Also, the other alkali metal and alkaline earth metal lignosulfonates are considered as equivalents for purposes of our invention. In summary, it may be said that our invention contemplates the use of lignosulfonate compositions in the absence of an activating agent as a plugging medium in high permeability zones to render oil-bearing strata more uniform in permeability so that in subsequent flooding operations greater sweep efficiency can be realized.

We claim:

1. In a method for the recovery of oil from an underground deposit thereof, said deposit being penetrated by an injection well and by a producing well, in which method a steamflooding medium, underground combustion medium, or high-temperature flooding medium is injected into said deposit through said injection well to displace oil toward said producing well, and wherein said steamflooding, combustion medium, or high-temperature flooding medium tends to channel through relatively high permeability strata in said deposit, resulting in a nonuniform steamflood, combustion front, or high-temperature flooding front, the improvement which comprises introducing into said deposit an aqueous gel-forming solution of a water-soluble lignosulfonate containing from about 2 to about 20 weight percent reducing sugars wherein said solution is capable of gelation at temperatures in excess of 250° F, with a characteristic gel time from about 1 to about 2,000 hours, and said solution being in an amount sufficient to flow into said high permeability strata, allowing said solution to set in said high permeability strata to form a gel therein, thereafter introducing said steamflooding or combustion medium into said deposit through said injection, and recovering oil from said producing well.

2. The method of claim 1, wherein said lignosulfonate is selected from the group consisting of sodium lignosulfonate and ammonium lignosulfonate.

3. The method of claim 2, wherein the concentration of said sodium or ammonium lignosulfonate employed in said solution ranges from about 3 to about 20 weight percent.

4. The method of claim 2, wherein the gel-forming occurs from about 250° to 450° F.

5. The method of claim 4, wherein the concentration of said sodium or ammonium lignosulfonate employed in said solution ranges from about 4 to about 10 weight percent.

6. The method of claim 1 in which said gel-forming solution is introduced into said deposit via said injection well.

7. The method of claim 1 in which said gel-forming solution is introduced into said deposit via said producing well.

8. The method of claim 1 wherein said lignosulfonate-containing solution is capable of gelation with a characteristic gel time from about 10 to 840 hours.

9. The method of claim 8 wherein said lignosulfonate is an ammonium lignosulfonate.

10. A method for plugging permeable zones in the vicinity of a wellbore at temperatures in excess of 400° F involving the steps of introducing in the permeable zone to be plugged an aqueous gel-forming solution of a water-soluble lignosulfonate containing from about 2 to about 20 weight percent reducing sugars wherein said solution is capable of gelation at temperatures in excess of 400° F, with a characteristic gel time from about 1 to about 30 hours, and said solution being in an amount sufficient to flow into said permeable zone, and allowing said solution to set in said permeable zone to form a gel therein, thereby plugging said permeable zone.

11. The method of claim 10, wherein said lignosulfonate is selected from the group consisting of sodium lignosulfonate and ammonium lignosulfonate.

12. A method for plugging permeable zones of a wellbore at temperatures in excess of 250° F involving the steps of introducing in the permeable zone to be plugged an aqueous gel-forming solution of a water-soluble lignosulfonate containing from about 2 to about 20 weight percent reducing sugars wherein said solution is capable of gelation at temperatures in excess of 250° F, with a characteristic gel time from about 1 to about 2000 hours, and said solution being in an amount sufficient to flow into said permeable zone, and allowing said solution to set in said permeable zone to form a gel therein, thereby plugging said permeable zone.

* * * * *